United States Patent
Daragon et al.

(10) Patent No.: US 10,113,461 B2
(45) Date of Patent: Oct. 30, 2018

(54) DELIVERY MODULE FOR USE IN A SYSTEM FOR PURIFYING THE EXHAUST GASES OF A COMBUSTION ENGINE

(71) Applicant: PLASTIC OMNIUM ADVANCED INNOVATION AND RESEARCH, Brussels (BE)

(72) Inventors: Aurelien Daragon, Brussels (BE); Stephane Leonard, Brussels (BE); David Ribeiro, Carvin (FR); Charlotte Corlay, Brussels (BE)

(73) Assignee: PLASTIC OMNIUM ADVANCED INNOVATION AND RESEARCH, Brussels (BE)

( * ) Notice: Subject to any disclaimer, the term of this patent is extended or adjusted under 35 U.S.C. 154(b) by 222 days.

(21) Appl. No.: 14/917,836

(22) PCT Filed: Sep. 3, 2014

(86) PCT No.: PCT/EP2014/068665
§ 371 (c)(1),
(2) Date: Mar. 9, 2016

(87) PCT Pub. No.: WO2015/036290
PCT Pub. Date: Mar. 19, 2015

(65) Prior Publication Data
US 2016/0341092 A1     Nov. 24, 2016

(30) Foreign Application Priority Data
Sep. 10, 2013  (EP) ..................... 13183682

(51) Int. Cl.
*F01N 3/20*     (2006.01)
(52) U.S. Cl.
CPC ........ *F01N 3/2066* (2013.01); *F01N 2530/18* (2013.01); *F01N 2610/02* (2013.01);
(Continued)

(58) Field of Classification Search
CPC ...... F01N 3/08; F01N 3/208; F01N 2610/143; F01N 2900/0422; F01N 2900/08; F01N 2900/1808; B01D 2257/404; Y02T 10/24
See application file for complete search history.

(56) References Cited

U.S. PATENT DOCUMENTS

| 2009/0230136 A1* | 9/2009 | Dougnier ............. F01N 3/2066 220/592.01 |
| 2010/0050603 A1* | 3/2010 | Seino ................... F01N 3/2066 60/282 |

(Continued)

FOREIGN PATENT DOCUMENTS

| DE | 10 2010 001745 A1 | 8/2011 |
| DE | 10 2010 024554 A1 | 12/2011 |

(Continued)

OTHER PUBLICATIONS

DE 102010039040, Machine Translation, Translated Jan. 10, 2018.*
(Continued)

*Primary Examiner* — Patrick Maines
(74) *Attorney, Agent, or Firm* — Oblon, McClelland, Maier & Neustadt, L.L.P.

(57) ABSTRACT

A liquid delivery module including: a base plate positioned through an opening made in a wall of a liquid tank; a pump assembly configured to pump liquid from the base plate and to deliver the liquid to a supply line, via a hydraulic connector; a cover adapted to be fixed to the base plate. The pump assembly is mounted outside the tank. The hydraulic connector is partially or entirely integrated to the cover.

7 Claims, 1 Drawing Sheet

(52) U.S. Cl.
CPC ............. *F01N 2610/1406* (2013.01); *F01N 2610/1433* (2013.01); *Y02T 10/24* (2013.01)

(56) References Cited

U.S. PATENT DOCUMENTS

| | | | |
|---|---|---|---|
| 2010/0175369 A1* | 7/2010 | Op De Beeck | B01D 35/027 60/274 |
| 2012/0311999 A1* | 12/2012 | Hodgson | F01N 3/2066 60/295 |
| 2013/0025269 A1* | 1/2013 | Hodgson | F01N 3/2066 60/317 |
| 2013/0263938 A1 | 10/2013 | Harr et al. | |
| 2014/0079610 A1 | 3/2014 | Op De Beeck et al. | |
| 2014/0174058 A1* | 6/2014 | Maguin | F01N 3/2066 60/282 |
| 2015/0267588 A1* | 9/2015 | Treudt | F01N 3/2066 60/295 |

FOREIGN PATENT DOCUMENTS

| | | | | |
|---|---|---|---|---|
| DE | 102010029636 A1 * | 12/2011 | ........... | F01N 3/2066 |
| DE | 10 2010 039040 A1 | 2/2012 | | |
| DE | 102010039040 A1 * | 2/2012 | ........... | F01N 3/2066 |
| WO | WO 2009/007405 A1 | 1/2009 | | |

OTHER PUBLICATIONS

International Search Report dated Nov. 10, 2014 in PCT/EP2014/068665 filed Sep. 3, 2014.
European Search Report dated Dec. 13, 2013 in EP 13 18 3682 filed Sep. 10, 2013.

* cited by examiner

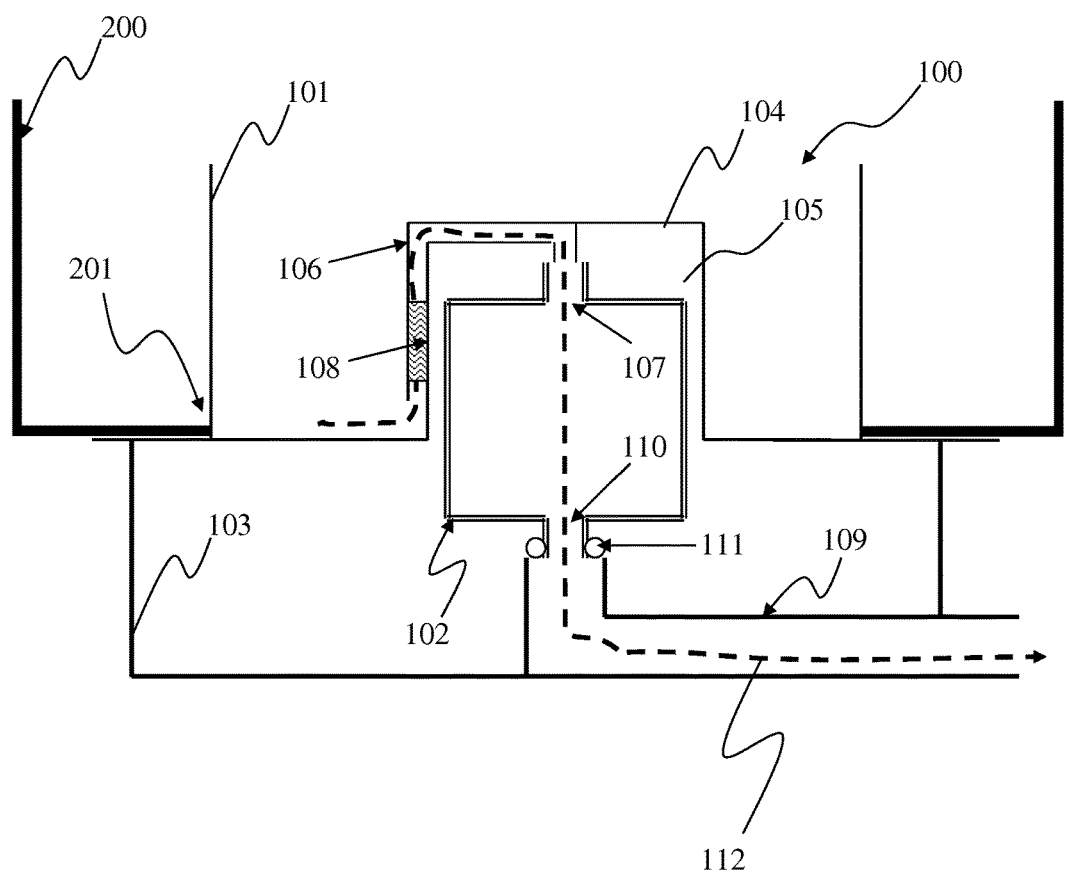

DELIVERY MODULE FOR USE IN A SYSTEM FOR PURIFYING THE EXHAUST GASES OF A COMBUSTION ENGINE

The present invention relates to a system for purifying the exhaust gases of a combustion engine (i.e. SCR system). The invention further relates to a delivery module for use in such system. The invention also applies to fuel system.

Legislation on vehicle and truck emissions stipulates, amongst other things, a reduction in the release of nitrogen oxides NOx into the atmosphere. One known way to achieve this objective is to use the SCR (Selective Catalytic Reduction) process which enables the reduction of nitrogen oxides by injection of a reducing agent, generally ammonia, into the exhaust line. This ammonia may derive from the pyrolytic (thermal) decomposition of an ammonia precursor solution, generally a urea solution.

With the SCR process, the high levels of NOx produced in the engine during combustion at optimized efficiency are treated in a catalyst on exiting the engine. This treatment requires the use of the reducing agent at a precise concentration and of extreme quality.

In order to do this, it is necessary to equip the vehicles with a tank containing an additive solution (generally a eutectic urea/water solution) and also with a device for metering the desired amount of additive and injecting it into the exhaust line.

It is known different SCR system architectures. One known architecture is based on the use of a subassembly, also called hereafter "delivery module", for supplying additive to said device for metering.

Generally, such delivery module comprises a base plate (also called "flange" or "mounting plate") and a cover. The base plate comprises several electrical components. The cover is adapted to be fixed to the base plate. Generally, the cover comprises an electrical connector adapted to connect the components of the base plate to a controller (or "ECU", for "engine control unit"). WO 2009/007405 describes a base plate architecture. Such base plate integrates a compact pump assembly and a hydraulic connector. The hydraulic connector is configured to connect the pump assembly to a supply line for supplying the additive solution to the exhaust gases of an engine. According to this known architecture, the hydraulic connector is moulded from one part with the base plate. The pump assembly is adapted to be submerged in the additive to be pumped. Since the pump assembly is placed within the tank and is in contact with the additive, there exists a potential risk that, when the additive solution freezes, ice pressure damages parts of the pump assembly. In addition, there exists a potential risk of permeation such that additive solution can come into contact with sensitive parts of the pump assembly (for example the magnetic coils of the pump).

In view of the above, there exists a need for an improved delivery module architecture.

An object of the present invention is to solve these above-mentioned problems by proposing a liquid delivery module comprising:
- a base plate positioned through an opening made in a wall of a liquid tank;
- a pump assembly configured to pump liquid from the base plate and to deliver it to a supply line, via a hydraulic connector;
- a cover adapted to be fixed (i.e. sealed) to the base plate.

According to a first aspect of the present invention, at least a part of the hydraulic connector is attached to or mounted inside the cover. According to a second aspect of the present invention, the pump assembly is mounted outside the tank, and preferably in-between the base plate and the cover.

Thus, it is proposed an improved delivery module architecture in which the pump assembly is not immersed in the liquid. More precisely, the pump assembly of the invention is mounted in a closed dry area located outside the tank. Thus, the pump assembly is protected from ice pressure and there is no risk of permeation. According to the invention, the closed dry area is defined by the base plate and the cover. In a preferred embodiment, the hydraulic connector is entirely integrated to the cover. This is understood to mean that the hydraulic connector is either attached to the cover or produced from one piece with the cover. The base plate of the invention is simple since it does not integrate the pump assembly and the hydraulic connector. In a particular embodiment, the hydraulic connector and the pump assembly can be equipped with complementary reliefs that enable them to be assembled rapidly by a rapid connection of the "snap fit" or "quick connect" type, well known to a person skilled in the art. Thus, the connection of the pump assembly and the hydraulic connector is simple. In another particular embodiment, the pump assembly can be screwed onto a thread on the hydraulic connector. In this last case, a seal or a paste can be used to make the threaded interface more leak-tight. In addition, the delivery module architecture of the invention is simplified since the pump assembly may comprise a flow through pump (also called pass through pump). As mentioned above, the pump assembly of the invention is mounted outside the tank; more precisely it is mounted within a dry area defined between the cover and the base plate. An advantage of this configuration is that the cover can be easily removed to access to the pump assembly. Thus the pump assembly can be easily mounted/dismounted from the delivery module (for example, in case of replacement of a defective pump assembly). The electrical connection of the pump assembly is also simple.

In a preferred embodiment, the hydraulic connector is moulded from one piece with the cover, preferably by injection-moulding of a plastic. Thus, the cover with the integrated hydraulic connector is compact and robust.

In an advantageous embodiment, the base plate comprises a recess directed towards the inside of the tank and being closed by the cover so as to form a chamber for receiving (i.e. mounting) the pump assembly. Thus, the delivery module of the invention is compact. For example, the cover can be welded, clipped or glued to the base plate.

In a particular embodiment, the base plate comprises a liquid entry channel adapted to be in fluid communication at one end with the tank and at the other end with an inlet of the pump assembly. According to one aspect of the present invention, the liquid entry channel comprises a filter. This filter may be of any known type. A simple accordion-pleated filter paper gives good results.

In a particular embodiment, the pump assembly comprises an outlet adapted to be fixed in a leak-tight way to the hydraulic connector by using an O-ring.

The liquid in which is concerned by the present invention is preferably a compound that is liquid under normal usage conditions and that plays an active role in a motor vehicle, heavy goods vehicle, etc. This liquid may be used namely for cleaning, lubrication, braking, suspension, cooling or pollution control. In one particularly appropriate embodiment, the invention is used in the context of the pollution control of vehicle exhaust gases. In this case, the fluid may be, for example, an additive used for the regeneration of a particulate filter (PF) or may be injected into the exhaust gases to reduce the NOx content thereof. However, the present invention applies particularly well to a reducing agent capable of reducing the NOx present in the exhaust gases of the vehicle's engine. It is advantageously an ammonia precursor in aqueous solution. The invention gives good results with aqueous solutions of urea and in particular, eutectic solutions of urea with water such as solutions of AdBlue®, the urea content of which is between 31.8 and 33.2 wt % and which contain around 18% of ammonia. The invention may also be applied to urea/ammonium formate mixtures in aqueous solution, sold under the trademark Denoxium® and which contain around 13% of ammonia. The latter have the advantage, with respect to urea, of only freezing from and below −35° C. (as opposed to −11° C.), but have the disadvantages of corrosion problems linked to the release of formic acid.

In a preferred embodiment, the liquid tank is adapted for storing an ammonia precursor solution. This tank may be made from any material, preferably one that is chemically resistant to the solution in question. In general, this is metal or plastic. In the case of urea solution, polyolefin resins, in particular polyethylene (and more particularly HDPE or high-density polyethylene), constitute preferred materials.

The present invention is illustrated in a non limitative way by the example below relying on FIG. 1 attached.

FIG. 1 is a schematic view of a delivery module 100 according to a particular embodiment of the present invention.

As illustrated in the example of FIG. 1, the delivery module 100 comprises:
  a base plate 101;
  a flow through pump assembly 102; and
  a cover 103.

In a particular embodiment, the base plate 101 is positioned through an opening 201 made in the bottom wall of a urea tank 200. In the example of FIG. 1, the base plate 101 comprises a recess 104 directed towards the inside of the tank 200. The recess 104 is closed by the cover 103 so as to form a dry chamber 105. The dry chamber 105 is located outside the tank 200. The pump assembly 102 is placed inside the dry chamber 105. Thus, the pump assembly 102 is placed outside the tank 200. The base plate 101 also comprises a part (integral with the base plate 101) that forms an entry channel 106. The entry channel 106 is in fluid communication at one end with the interior of the tank and at the other end with an inlet 107 of the pump assembly. For example, the inlet 107 of the pump assembly and the corresponding end of the entry channel 106 can be equipped with complementary reliefs that enable them to be assembled rapidly by a rapid connection of the "snap fit" or "quick connect" type. Advantageously, the entry channel 106 comprises a filter 108. The cover 103 is fixed to the base plate 101. For example, the cover 103 is glued to the base plate 101. Such assembly is simple. The cover 103 integrates a hydraulic connector 109. In this example, the hydraulic connector 109 is moulded from one piece with the cover 103. The cover 103 and the hydraulic connector 109 form a single molded piece of plastic. The pump assembly 102 comprises an outlet 110 fixed in a leak-tight way to the hydraulic connector 109. For example, an O-ring 111 is used for this purpose. The pump assembly 102 is configured to pump liquid in the base plate 101 and to deliver it to a supply line (not represented), via the hydraulic connector 109, as represented by the dotted line 112.

The invention claimed is:

1. A liquid delivery module comprising:
  a base plate positioned through an opening made in a wall of a liquid tank;
  a pump assembly configured to pump liquid from the base plate and to deliver the liquid to a supply line, via a hydraulic connector; and
  a cover adapted to be fixed to the base plate;
  wherein the pump assembly is mounted outside the tank and at least a part of the hydraulic connector is attached to or mounted inside the cover,
  wherein the hydraulic connector is molded from one piece with the cover, by injection-molding of a plastic, and
  wherein the pump assembly is mounted within a dry area defined between the cover and the base plate.

2. A liquid delivery module according to claim 1, wherein the base plate comprises a recess directed towards the inside of the tank and being closed by the cover to form a chamber for receiving the pump assembly.

3. A liquid delivery module according to claim 1, wherein the base plate comprises a part that forms a liquid entry channel configured to be in fluid communication at a first end with the tank and at a second end with an inlet of the pump assembly, and wherein the liquid entry channel comprises a filter.

4. A liquid delivery module according to claim 1, wherein the pump assembly comprises an outlet adapted to be attached in a leak-tight way to the hydraulic connector by using an O-ring.

5. A liquid delivery module according to claim 1, wherein the liquid is an ammonia precursor solution.

6. A liquid delivery module according to claim 5, wherein the ammonia precursor solution is a urea solution.

7. A SCR or Selective Catalytic Reduction system for purifying exhaust gases of an internal combustion engine of a vehicle, comprising:
  a tank for the storage of an ammonia precursor solution; and
  a liquid delivery module according to claim 1.

* * * * *